United States Patent
Niwa et al.

(10) Patent No.: US 6,786,260 B2
(45) Date of Patent: Sep. 7, 2004

(54) PNEUMATIC RADIAL TIRE FOR NEGATIVE CAMBER ANGLE SUSPENSION

(75) Inventors: Masakazu Niwa, Hiratsuka (JP); Katsuyuki Kato, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 118 days.

(21) Appl. No.: 10/322,719

(22) Filed: Dec. 19, 2002

(65) Prior Publication Data

US 2003/0121582 A1 Jul. 3, 2003

(30) Foreign Application Priority Data

Dec. 27, 2001 (JP) ........................................ 2001-396097

(51) Int. Cl.[7] .............................. B60C 3/00; B60C 11/00
(52) U.S. Cl. ................... 152/454; 152/456; 280/86.751
(58) Field of Search ................................. 152/454, 455, 152/456, 538

(56) References Cited

U.S. PATENT DOCUMENTS 6,408,908 B1 * 6/2002 Scarpitti et al. ........ 152/454 X

* cited by examiner

Primary Examiner—Adrienne C. Johnstone
(74) Attorney, Agent, or Firm—Rader, Fishman & Grauer PLLC

(57) ABSTRACT

A pneumatic radial tire has a tire meridian cross-sectional configuration of a tread surface portion on at least one side of the tire center line which is arranged such that, when a position A is an intersection of the tire center line and the tread surface, and when a position B is an intersection of a straight line P drawn orthogonal to the tire axis from an edge of an innermost belt layer and the tread surface, an angle α between a straight line X connecting the positions A and B and a straight line Y drawn perpendicular to the tire center line from the position A is set in a range of 8 to 10 degrees, when the pneumatic radial tire is attached to a standard rim specified in JATMA with its air pressure being 180 kPa and with no load applied thereto.

4 Claims, 1 Drawing Sheet

PNEUMATIC RADIAL TIRE FOR NEGATIVE CAMBER ANGLE SUSPENSION

BACKGROUND OF THE INVENTION

The present invention relates to a pneumatic radial tire and, more specifically, to a pneumatic radial tire to be attached to a vehicle with a suspension to which a negative camber angle is set, in which high-speed durability and driving stability can be improved.

In recent years, in order to improve driving stability of a vehicle, or in terms of trends, the number of vehicles with a suspension to which a negative camber angle is set has been increasing. Pneumatic tires are attached to such a vehicle in such a manner that upper portions of the tires are inclined inward when viewed from a front side of the vehicle.

Since the negative camber angle is provided as described above, change in the camber angle with respect to a road surface decreases in cornering, whereby proper contact to the ground can be obtained, and the cornering is stabilized. Moreover, initial turning ability (a changing rate of a direction of a vehicle front when starting to turn a steering wheel) is improved.

However, when the tire is used at the negative camber angle as described above, the ground contact pressure on a tread surface in running straight decreases in a vehicle outer side portion thereof and increases in a vehicle inner side portion thereof, thereby causing an uneven ground contact pressure distribution on the tread surface. Particularly, when the camber angle is no more than −2 degrees, a ground contact area and ground contact pressure drastically increase in a shoulder portion on the vehicle inner side of the tread surface, and the unevenness of the ground contact pressure distribution is remarkable. As a result, there is a problem that durability in high-speed running is reduced. In addition, since the ground contact pressure in the vicinity of the shoulder portion on the vehicle inner side increases, the ground contact pressure decreases locally in the crown portion. Therefore, a problem arises that cornering limitation properties (lateral acceleration resistance) is deteriorated and the driving stability is contrarily lowered.

SUMMARY OF THE INVENTION

An object of the present invention is to provide a pneumatic radial tire to be attached to a vehicle with a suspension to which a negative camber angle is set, which is capable of improving high-speed durability and driving stability.

In order to achieve the above object, a pneumatic radial tire according to the present invention includes right and left bead portions, at least one carcass layer being laid between the bead portions, a plurality of belt layers being arranged on an outer periphery of the carcass layer in a tread portion, a tread surface of the tread portion being formed into a curved surface so that parts thereof in shoulder portion sides is tire-radially inwardly of that in a crown portion side, characterized in that, when the pneumatic radial tire is attached to a standard rim specified in JATMA with its air pressure being 180 kPa and with no load applied thereto, a tire meridian cross-sectional configuration of a tread surface portion of the tread surface on at least one side of a tire center line is arranged such that, when a position A is an intersection of the tire center line and the tread surface and a position B is an intersection of a straight line P drawn orthogonal to the tire axis from an edge of an innermost belt layer of the belt layers and the tread surface, an angle α between a straight line X connecting the positions A and B and a straight line Y drawn perpendicular to the tire center line from the position A is set in a range of 8 to 10 degrees.

According to the present invention described above, one side of the tread surface is shaped in a curved surface more slanted than that of conventional tires. Accordingly, when the pneumatic radial tire of the present invention is attached to a vehicle with a suspension to which a negative camber angle is set with the one side of the tread surface being located on the vehicle inner side, a local increase of the ground contact pressure on a shoulder portion on the one side can be suppressed, and a ground contact pressure distribution more even than before can be obtained. Therefore, high-speed durability and driving stability can be improved.

DETAILED DESCRIPTION OF PREFERRED EMBODIMENT

Figure 1:
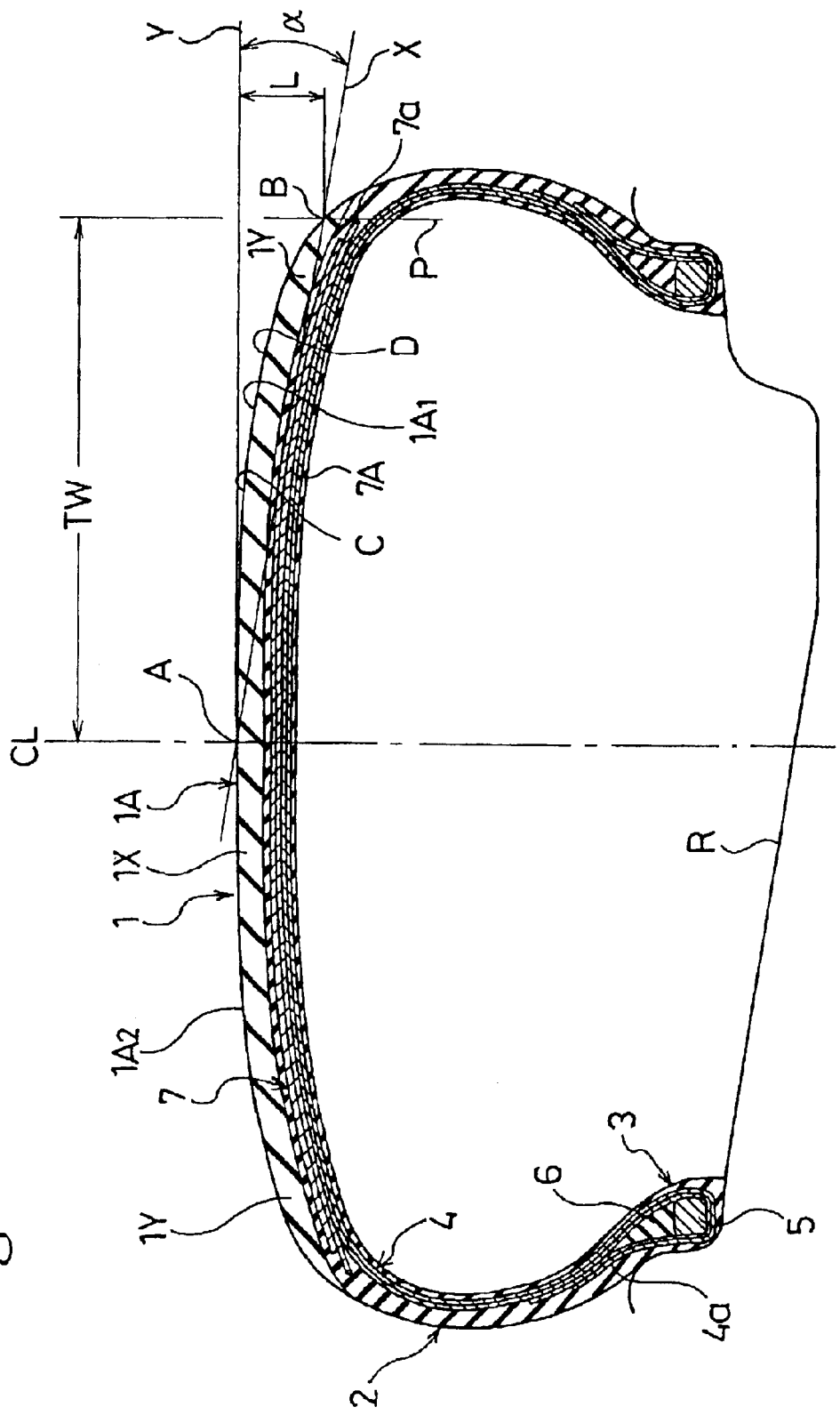
FIG. 1 is a cross-sectional view showing a pneumatic radial tire according to the present invention, taken along a tire meridian.

FIG. 1 shows a pneumatic radial tire according to the present invention. The reference numeral 1 denotes a tread portion; 2 denotes sidewall portions; 3 denotes bead portions; and CL denotes a tire center line.

Two carcass layers 4 are laid between right and left bead portions 3. Both end portions 4a of the carcass layers 4 are turned around bead cores 5 embedded in the bead portions 3 from the inner side of the tire toward the outer side thereof so as to sandwich a bead filler 6. Two belt layers 7 are disposed on the outer periphery of the carcass layers 4 in the tread portion 1.

As shown in FIG. 1, a tread surface 1A of the tread portion 1 is formed in an arc shape projecting tire-radially outward in a tire meridian cross-sectional configuration. The tread surface 1A is shaped in a curved surface such that parts thereof in shoulder portion 1Y sides of the tread portion 1 are positioned radially inwardly of that in a crown portion 1X side thereof. Each part of the tread surface 1A located in the both shoulder portions 1Y is formed into an arc with a radius smaller than a radius of the part of the tread surface 1A located in the crown portion 1X.

The above described tread surface 1A has a tread surface portion $1A_1$ on one side (inner side when the tire is attached to the vehicle) of the tire center line CL, which is shaped as follows in the tire meridian cross-section, when the pneumatic radial tire is attached to a standard rim R specified in JATMA (JATMA YEAR BOOK 2001), and is filled with air at a pressure of 180 kPa, with no load applied thereto.

When an intersection of the tire center line CL and the tread surface 1A is a position A, and an intersection of a straight line P drawn orthogonal to the tire axis from an edge 7a of an innermost belt layer 7A of the belt layers 7 and the tread surface portion $1A_1$ is a position B, an angle α between a straight line X connecting the positions A and B and a straight line Y drawn perpendicular to the tire center line CL from the position A is set in a range of 8 to 10 degrees.

In such a manner, since the angle α is set to be larger than the conventional one in the above described range with respect to the tread surface portion $1A_1$ on the one side, which is the inner side when the tire is attached to the vehicle, the tread surface portion $1A_1$ is shaped in a curved surface more slanted than that of conventional structured tires. Therefore, when the tire is attached to the vehicle with a suspension to which a negative camber angle is set, the ground contact pressure which has increased locally in the shoulder portion 1Y of the tread surface portion 1A$_1$ in the prior art is reduced, and a ground contact pressure distribution more even than the conventional one can be obtained between the crown portion 1X and the shoulder portion 1Y in the tread surface portion 1A$_1$. Accordingly, high-speed durability and driving stability can be improved.

When the angle α is less than 8 degrees, the ground contact pressure on the shoulder portion 1Y in the tread surface portion 1A$_1$ locally increases, and the improvement of high-speed durability and driving stability becomes difficult. When the angle α is more than 10 degrees, the amount of reduction in the ground contact area of the tread surface 1A increases, thus badly affecting the driving stability.

In the present invention, when the reference character TW denotes a tread width from the tire center line CL to the position B measured parallel to the tire axis and the reference character L denotes a distance from the straight line Y to the position B measured perpendicular to the straight line Y, a position C on the tread surface portion 1A$_1$ which is 45% of the tread width TW away from the tire center line CL when measured parallel to the tire axis may be located in a range of 6 to 15% of the distance L from the straight line Y, measuring perpendicular to the straight line Y.

When the distance between the position C and the straight line Y is less than 6% of the distance L, a local reduction of the ground contact pressure occurs in the crown portion 1X, whereby driving stability is reduced. When the distance between the position C and the straight line Y is more than 15% of the distance L, the crown portion 1X locally excessively drops radially inward, thereby causing the ground contact pressure on the crown portion 1X to increase and locally large change in the ground contact pressure to be generated. As a result, high-speed durability is lowered.

A position D on the tread surface portion 1A$_1$ which is 75% of the tread width TW away from the tire center line CL when measured parallel to the tire axis may be located in a range of 30 to 40% of the distance L from the straight line Y, measuring perpendicular to the straight line Y. When the distance between the position D and the straight line Y is less than 30% of the distance L, driving stability is reduced as in the above. When the distance between the position D and the straight line Y is more than 40%, high-speed durability is lowered because of the above-described reason.

In the above-described embodiment, the pneumatic radial tire having two carcass layers 4 and two belt layers 7 has been illustrated. However, the present invention is applicable to pneumatic radial tires having at least one carcass layer 4 and at least two belt layers 7.

In the aforementioned embodiment, the tread surface portion 1A$_1$ on the one side is specified as described above. However, a tread surface portion 1A$_2$ on the other side may be similarly structured. In cornering, the tire attached to the vehicle is inclined toward the cornering direction. The tread surface portion 1A$_2$ on the other side having the same structure as the above can also provide an improvement of driving stability in cornering.

The present invention is suitably applicable, in particular, to a pneumatic radial tire for a passenger vehicle, which is to be attached to a vehicle with a suspension to which a negative camber angle is set in a range of −1.5 to −4 degrees.

EXAMPLE

Present invention tires 1 and 2, comparative tires 1 and 2, and a conventional tire with the same tire size of 225/45ZR17 and the construction of FIG. 1 were prepared, respectively, having the angles α shown in Table 1.

In the present invention tires 1 and 2, and comparative tires 1 and 2, the distance between the position C and the straight line Y was 10% of the distance L, and the distance between the position D and the straight line Y was 35% of the distance L. In the conventional tire, the distance between the position C and the straight line Y was 5% of the distance L, and the distance between the position D and the straight line Y was 20% of the distance L.

Each of the test tires was attached to a rim having a size of 17×71/2JJ, with its air pressure being 180 kPa, and evaluation tests of high-speed durability and driving stability were carried out by the following measurement methods. The results shown in Table 1 were obtained. The camber angle in each evaluation test was −2.5 degrees.

High-speed Durability

For each test tire, a high-speed durability test was conducted based on "high-speed performance test A condition" in JIS D4230, and its result was evaluated by indices using the result of the conventional tire as 100. The larger the index, the more superior the high-speed durability is.

Driving Stability

Test tires were attached to a passenger vehicle with an engine displacement of 2000 cc, and a feeling test was then carried out by test drivers on a test course. The results were evaluated by indices using the result of the conventional tire as 100. The larger the index, the higher the driving stability is.

TABLE 1

|  | Angle α (degree) | High-speed durability | Driving stability |
| --- | --- | --- | --- |
| Conventional tire | 6 | 100 | 100 |
| Comparative tire 1 | 7 | 100 | 101 |
| Present invention tire 1 | 8 | 107 | 105 |
| Present invention tire 2 | 10 | 110 | 108 |
| Comparative tire 2 | 12 | 109 | 96 |

As can be seen in Table 1, it is understood that the tires of the present invention can improve high-speed durability and driving stability.

As described above, according to the present invention, since the angle α of the tread surface is specified in the foregoing manner, the tread surface having a ground contact pressure distribution more even than the conventional one can be obtained in the pneumatic radial tire to be attached to the vehicle with a suspension to which a negative camber angle is set. Accordingly, high-speed durability and driving stability can be improved.

What is claimed is:

1. A pneumatic radial tire having right and left bead portions, at least one carcass layer being laid between the bead portions, a plurality of belt layers being arranged on an outer periphery of the carcass layer in a tread portion, a tread surface of the tread portion being formed into a curved surface so that parts thereof in shoulder portion sides is tire-radially inwardly of that in a crown portion side, wherein, when said pneumatic radial tire is attached to a standard rim specified in JATMA with its air pressure being 180 kPa and with no load applied thereto, a tire meridian cross-sectional configuration of a tread surface portion of said tread surface on at least one side of a tire center line is arranged such that, when a position A is an intersection of the tire center line and the tread surface and a position B is an intersection of a straight line P drawn orthogonal to the tire axis from an edge of an innermost belt layer of said belt layers and the tread surface, an angle α between a straight line X connecting said positions A and B and a straight line Y drawn perpendicular to the tire center line from the position A is set in a range of 8 to 10 degrees.

2. The pneumatic radial tire according to claim 1, wherein a position C on the tread surface portion on said at least one side which is 45% of a tread width TW away from the tire center line when measured parallel to the tire axis is set in a range of 6 to 15% of a distance L from the straight line Y, measuring perpendicular to the straight line Y, the tread width TW being a distance from the tire center line to the position B measured parallel to the tire axis, and the distance L being a distance from the straight line Y to the position B measured perpendicular to the straight line Y.

3. The pneumatic radial tire according to claim 1, wherein a position D on the tread surface portion on said at least one side which is 75% of a tread width TW away from the tire center line when measured parallel to the tire axis is set in a range of 30 to 40% of a distance L form the straight line Y, measuring perpendicular to the straight line Y, the tread width TW being a distance from the tire center line to the position B measured parallel to the tire axis, and the distance L being a distance from the straight line Y to the position B measured perpendicular to the straight line Y.

4. The pneumatic radial tire according to claim 1, wherein the pneumatic radial tire is used for a vehicle with a suspension to which a camber angle in a range of −1.5 to −4 degrees is set.

* * * * *